(12) United States Patent
Lv et al.

(10) Patent No.: US 8,588,799 B2
(45) Date of Patent: Nov. 19, 2013

(54) METHOD AND APPARATUS FOR PROCESSING DOWNLINK COMMUNICATION AND CORRESPONDING ASSISTING METHOD AND APPARATUS

(75) Inventors: Di Lv, Shanghai (CN); Hongwei Yang, Shanghai (CN); Jinhui Chen, Shanghai (CN); Yang Song, Shanghai (CN)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/505,930

(22) PCT Filed: Nov. 4, 2009

(86) PCT No.: PCT/CN2009/074782
§ 371 (c)(1),
(2), (4) Date: May 3, 2012

(87) PCT Pub. No.: WO2011/054143
PCT Pub. Date: May 12, 2011

(65) Prior Publication Data
US 2012/0214500 A1    Aug. 23, 2012

(51) Int. Cl.
*H04W 72/00*    (2009.01)
(52) U.S. Cl.
USPC .............. 455/450; 375/259; 342/378; 704/1
(58) Field of Classification Search
USPC .............. 455/450; 375/259; 342/378; 704/1
See application file for complete search history.

(56) References Cited

U.S. PATENT DOCUMENTS

| 2007/0174038 A1 | 7/2007 | Wang et al. |
| 2009/0058727 A1* | 3/2009 | Sun et al. ...................... 342/378 |
| 2011/0103493 A1* | 5/2011 | Xia et al. ...................... 375/259 |

FOREIGN PATENT DOCUMENTS

| CN | 101277172 A | 10/2008 |
| CN | 101346899 A | 1/2009 |
| KR | 20080083808 A | 9/2008 |
| WO | WO2009131376 A2 | 10/2009 |

OTHER PUBLICATIONS

International Search Report for PCT/CN2009/074782 dated Aug. 19, 2010.

* cited by examiner

*Primary Examiner* — Charles Shedrick
(74) *Attorney, Agent, or Firm* — Fay Sharpe LLP

(57) ABSTRACT

A method and apparatus for processing downlink communication and a corresponding assisting method and apparatus are provided. According to an embodiment, a method for assisting a base station in processing downlink communication in a user equipment includes: estimating a downlink channel between the base station and the user equipment; determining a spatial correlation matrix between the base station and the user equipment according to the result of estimating the downlink channel; determining at least one pre-coding vector among a plurality of pre-stored pre-coding vectors based upon the spatial correlation matrix; and notifying the base station about the determined at least one pre-coding vector and spatial correlation matrix. The downlink communication processing disclosed herein improves the performance of a system, improves the average throughput and the throughput of an edge user of the multi-user MIMO system and has a wider applicability scope than the original codebook and feedback mechanism.

20 Claims, 4 Drawing Sheets

METHOD AND APPARATUS FOR PROCESSING DOWNLINK COMMUNICATION AND CORRESPONDING ASSISTING METHOD AND APPARATUS

FIELD OF THE INVENTION

The invention relates to downlink communication in a radio communication network and in particular to a feedback channel condition and subsequent processing therein.

BACKGROUND OF THE INVENTION

In the LTE-Advanced (hereinafter LTE-A), two categories of feedback information have been proposed in the discussion about downlink multi-user Multi-Input Multi-Output (MIMO) (hereinafter multi-user MIMO): an explicit feedback and an implicit feedback, where the explicit feedback refers to that a direct channel condition, e.g., an un-quantified or quantified channel matrix H, a eigenvector of a channel, etc., is fed back, and the implicit feedback refers to that an indirect channel condition related to processing of a transmitter and a receiver is provided to a base station in a channel pre-coding matrix index, etc. The latter is referred to as an implicit feedback because it is related to how a codebook is designed and searched.

In the LTE and the LTE-A, multi-user MIMO transmission is generally regarded as a crucial technology to improve the average capacity of a system and the experience of a user at the cell edge. The codebook-based implicit feedback is used in the LTE Release-8, that is, the codebook and feedback mechanism designed for single-user Multi-Input Multi-Output (MIMO) (hereinafter single-user MIMO) continues its use in multi-user MIMO. In other words, each user equipment feeds back its own single-user Pre-coding Matrix Index (PMI) and Channel Quality Indicator (CQI) even if this user equipment will finally be scheduled in multi-user transmission.

The foregoing solution in which the codebook and feedback mechanism for single-user MIMO simply continues its use hinders multi-user MIMO from being optimized and therefore has become a bottleneck restraining multi-user MIMO from offering a variety of technical advantages thereof. For example, a channel feedback error may degrade seriously the performance of multi-user MIMO because multi-user MIMO is more sensitive to the feedback error than single-user MIMO.

Therefore it is desired to improve the existing codebook and feedback mechanism in order to optimize the technology of multi-user MIMO in the LET-A.

SUMMARY OF THE INVENTION

The inventors of the invention have originally realized that a user of multi-user MIMO actually observes a channel which tends to vary in both the time and frequency domains, but this variation can not be reflected by a single PMI in a fixed codebook as adopted in the existing solution, therefore it is difficult for multi-user MIMO with a feedback using a fixed codebook to accommodate channels with varying spatial correlation characteristics, and the performance of multi-user MIMO is restricted seriously.

The inventors of the invention have also realized that the majority of channels are spatially correlated more or less under a practical transmission condition primarily dependent upon the condition and antenna configuration. Different user equipments generally observe different spatial correlation which are unique to the user equipments. In view of this, the invention proposes an application of spatial correlation to improve the existing codebook and feedback mechanism.

According to an embodiment of the invention, there is provided a method for assisting a base station in processing downlink communication in a user equipment, which includes the steps of: estimating a downlink channel between the base station and the user equipment; determining a spatial correlation matrix between the base station and the user equipment according to the result of estimating the downlink channel; determining at least one pre-coding vector among a plurality of pre-stored pre-coding vectors based upon the spatial correlation matrix; and notifying the base station about the determined at least one pre-coding vector and spatial correlation matrix.

Furthermore when the user equipment is the $i^{th}$ user equipment, its spatial correlation matrix in the $j^{th}$ frame is represented in the equation of:

$$R_{ij} = (1-\alpha)R_{i(j-1)} + \alpha \frac{1}{|S|} \sum_{l=1}^{|S|} H_{lj}^H H_{lj},$$

wherein |S| represents the average number of sub-carriers when the spatial correlation matrix is determined, $H_{lj}$ a channel matrix between the user equipment and the base station over the $l^{th}$ sub-carrier in the $j^{th}$ frame, and $\alpha$ represents an average factor in the time domain and $0 < \alpha \leq 1$.

Furthermore the user equipment generates a plurality of new pre-coding vectors according to the spatial correlation matrix and the plurality of pre-stored pre-coding vectors; and selects at least one new pre-coding vector among the plurality of new codewords according to a predetermined rule; and further determines at least one pre-stored pre-coding vector for generating the at least one new pre-coding vector.

Furthermore the user equipment generates the new pre-coding vectors:

$$c' = \frac{R_{ij}c}{|R_{ij}c|},$$

wherein c represents one pre-coding vector among the plurality of pre-stored pre-coding vectors, and C' represents one new pre-coding vector determined from c.

According to another embodiment of the invention, there is provided a method for processing downlink communication in a base station with the assistance of a user equipment, which includes the steps of: acquiring pre-coding vectors and spatial correlation matrixes determined respectively by a plurality of user equipments; determining channel conditions between the base station and the plurality of user equipments based the pre-coding vectors and the spatial correlation matrixes determined respectively by the plurality of user equipments; and processing downlink communication between the base station and the plurality of user equipments according to the determined channel conditions between the base station and the plurality of user equipments.

Furthermore the base station determines its channel conditions with the plurality of user equipments in the equation of:

$$h_i = \frac{R_i c_p}{|R_i c_p|},$$

wherein $h_i$ represents the channel condition determined by the $i^{th}$ user equipment among the plurality of user equipments, $R_i$ represents the spatial correlation matrix determined by the $i^{th}$ user equipment, and $c_p$ represents the pre-coding vector determined by the $i^{th}$ user equipment.

According to a further embodiment of the invention, there is provided a first apparatus for assisting a base station in processing downlink communication in a user equipment, which includes: a first unit for estimating a downlink channel between the base station and the user equipment; a second unit for determining a spatial correlation matrix between the base station and the user equipment according to the result of estimating the downlink channel; a third unit for determining at least one pre-coding vector among a plurality of pre-stored pre-coding vectors based upon the spatial correlation matrix; and a fourth unit for notifying the base station about the determined at least one pre-coding vector and spatial correlation matrix.

Furthermore when the user equipment is the $i^{th}$ user equipment, its spatial correlation matrix in the $j^{th}$ frame is represented in the equation of:

$$R_{ij} = (1-\alpha)R_{i(j-1)} + \alpha \frac{1}{|S|} \sum_{l=1}^{|S|} H_{lj}^H H_{lj},$$

wherein $|S|$ represents the average number of sub-carriers when the spatial correlation matrix is determined, $H_{lj}$ represents a channel matrix between the user equipment and the base station over the $l^{th}$ sub-carrier in the $j^{th}$ frame, and $\alpha$ represents an average factor in the time domain and $0<\alpha\leq 1$.

Furthermore the third unit includes: a first element for generating a plurality of new pre-coding vectors according to the spatial correlation matrix and the plurality of pre-stored pre-coding vectors; and a second element for selecting at least one new pre-coding vector among the plurality of new codewords according to a predetermined rule and determining at least one pre-stored pre-coding vector for generating the at least one new pre-coding vector.

Furthermore the first element generates the plurality of new pre-coding vectors in the equation of:

$$c' = \frac{R_{ij} c}{|R_{ij} c|}$$

wherein c represents one pre-coding vector among the plurality of pre-stored pre-coding vectors, and c' represents one new pre-coding vector determined from c.

According to a further embodiment of the invention, there is provided a second apparatus for processing downlink communication in a base station with the assistance of a user equipment, including: a fifth unit for acquiring pre-coding vectors and spatial correlation matrixes determined respectively by a plurality of user equipments; a sixth unit for determining channel conditions between the base station and the plurality of user equipments based the pre-coding vectors and the spatial correlation matrixes determined respectively by the plurality of user equipments; and a seventh unit for processing downlink communication between the base station and the plurality of user equipments according to the determined channel conditions between the base station and the plurality of user equipments.

Furthermore the sixth unit determines the channel conditions between the base station and the plurality of user equipments in the equation of:

$$h_i = \frac{R_i c_p}{|R_i c_p|},$$

wherein $h_i$ represents the channel condition determined by the $i^{th}$ user equipment among the plurality of user equipments, $R_i$ represents the spatial correlation matrix determined by the $i^{th}$ user equipment, and $c_p$ represents the pre-coding vector determined by the $i^{th}$ user equipment.

According to an embodiment of the invention, there is provided a user equipment comprising the foregoing first apparatus.

According to an embodiment of the invention, there is provided a base station comprising the foregoing second apparatus.

The methods, apparatuses, user equipment and base station according to the respective embodiments of the invention can achieve the following effects:

1. The performance of a system is improved, and the average throughput and the throughput of an edge user of the multi-user MIMO system are improved. Since a plurality of pre-coding variables newly generated by the user equipment include spatial characteristic unique to the user equipments, a finally determined pre-coding variable can better depict a channel character of the user equipment than a pre-stored pre-coding variable. Therefore a feedback error of the channel can be mitigated correspondingly. Furthermore the base station can perform effective multi-user pre-coding according to the more precise channel information fed back from the respective user equipments to thereby suppressing multi-user interference.

2. There is a wider applicability scope than the original codebook and feedback mechanism. A fixed codebook is adopted in the existing LTE system but can not accommodate different channel characteristics of multiple users. The invention combines the fixed codebook with the spatial correlation of the user equipment to thereby improve the precision of a feedback.

BRIEF DESCRIPTION OF DRAWINGS

Other features and advantages of the invention will become more apparent and prominent from the following description of at least one non-limiting embodiment of the invention with reference to the drawings in which.

In the drawings, identical or like reference numerals denote identical or like technical features.

DETAILED DESCRIPTION OF EMBODIMENTS

Figure 1:
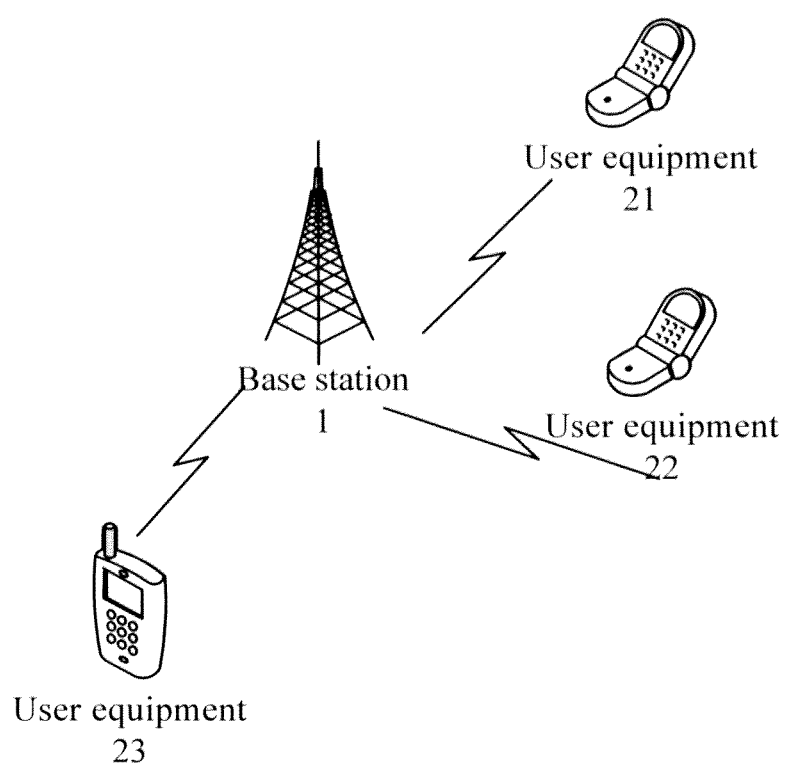
FIG. 1 illustrates a typical application scenario of the invention.

At least one non-limiting embodiment of the invention will be described below with reference to the drawings. Initial reference is made to FIG. 1 illustrating a typical application scenario of the invention, only one base station 1 and three user equipments 21 to 23 are illustrated for simplicity. In an application of the technology of multi-user MIMO, the user equipments 21 to 23 estimate downlink channels according to a common pilot signal transmitted from the base station 1 and feed back channel conditions to the base station 1, that is, indicate to the bases station 1 the downlink channels they "see", and the base station 1 determines specific downlink communication modes for the respective user equipments according to the channel conditions fed back from the respective user equipments. For example, it communicates with one of the user equipments in the mode of single-user MIMO and puts the other two user equipments together and communicates with them in the mode of multi-user MIMO, etc., where multi-user MIMO may further involve interference cancellation and other technologies, a detailed description of which will be omitted here.

Particularly a typical technology for a user equipment to report a channel condition to a base station is to use a codebook, where if various possible channel conditions are regarded as a plane, then the codebook is a set of a limited number of typical points on the plane with each point being a codeword in the codebook. These typical points approximate to and thus represent a practical channel condition. In a practical application, sixteen codewords are represented in four bits to lower a signaling overhead, and any practical channel is compared with these sixteen codewords to thereby select the most approximate codeword. A simulation has demonstrated that multi-user MIMO is more sensitive to an error between a selected codeword and a practical channel than single-user MIMO, and this is embodied as a larger loss in performance and more serious interference. The error is often referred to as a feedback error.

Since the codebook is fixed, that is, it includes a fixed number of codewords, there is always a difference between these codewords and a practical channel condition of the user equipment, and if the variability of a channel in the time and frequency domains is disregarded, then a feedback mechanism purely dependent upon a pre-stored fixed codebook will be ossified and less robust.

In view of the foregoing problem, the invention proposes a feedback mechanism assisted with a spatial correlation. Simply for the purpose of describing this solution concretely, it can be appreciated that for each user equipment, a new codebook corresponding to the user equipment is generated to include spatial correlation information corresponding to the user equipment. Therefore the precision of a channel feedback can be improved over a fixed codebook. A PMI is selected from this new codebook according to different selection criteria including a maximum channel capacitance, a minimum mean-square error, a maximum signal to noise ratio (see "Limited feedback unitary precoding for spatial multiplexing systems" by D. J. Love, et al., IEEE Trans. On Information Theory, Vol. 51, No. 8, 2005), and the PMI is fed back to the base station together with a spatial correlation matrix. The base station stores an originally pre-stored codebook and the fed-back spatial correlation matrix in association with a channel for use in a subsequent operation.

Figure 2:
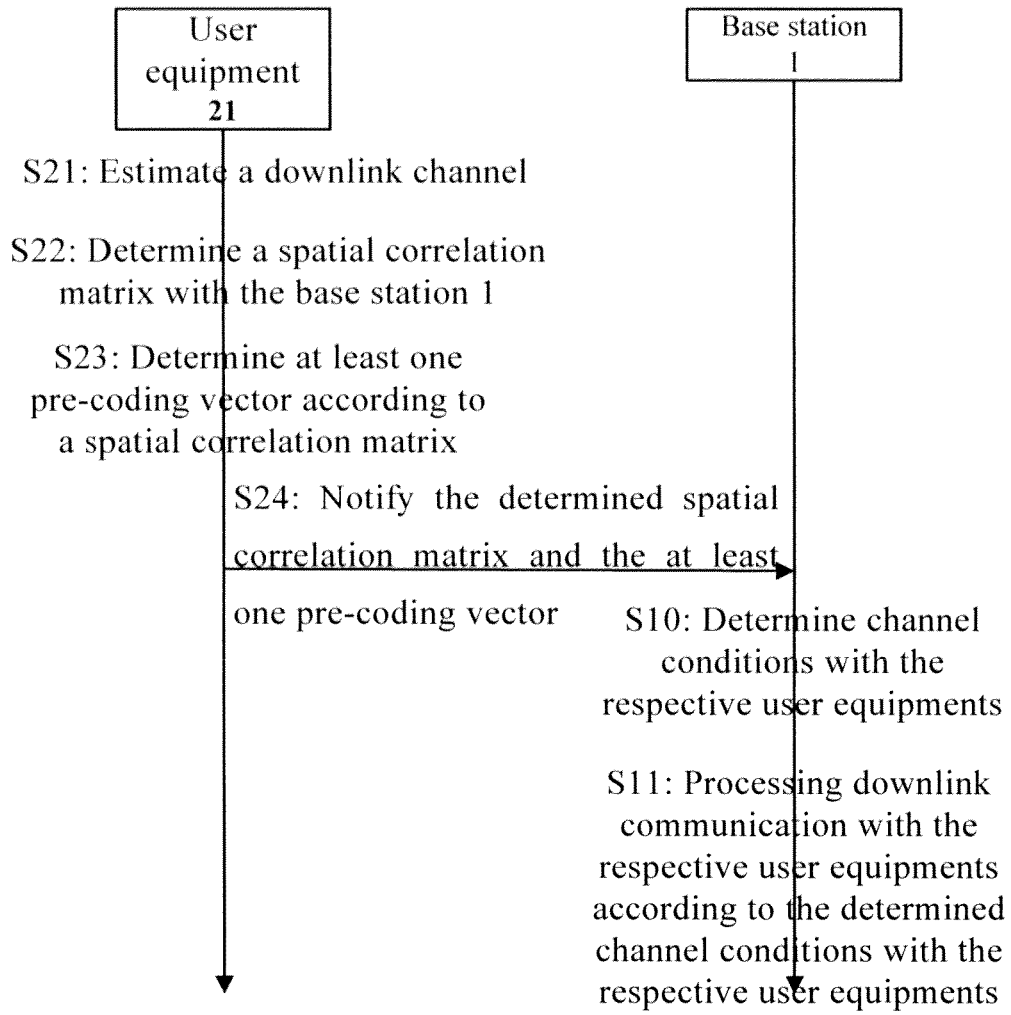
FIG. 2 illustrates a flow chart of a systematic method of feeding back and processing a channel condition in a radio communication network according to an embodiment of the invention.

Reference is made to FIG. 2 illustrating a flow chart of a systematic method of feeding back and processing a channel condition in a radio communication network according to an embodiment of the invention, and is the embodiment of the invention will be described below with reference to FIG. 2 and taking the base station 1 and the user equipments 21 to 23 in FIG. 1 as an example. Those skilled in the art can appreciate that the user equipments 22 and 23 can also perform the same operations as the user equipment 21 although only the user equipment 21 is illustrated in FIG. 2 for simplicity.

The method starts with the step S21 where the user equipment 21 estimates a downlink channel based upon a common pilot signal transmitted from the base station 1 and derives a channel matrix $H_{lj}$ without loss of generality, where j represents the $j^{th}$ frame, and $l=1 \ldots |S|$ with $|S|$ representing the average number of sub-carriers when a spatial correlation matrix is determined subsequently, which can take the value of 1 or the number of sub-carriers in one or more resource block symbols or even the total number of sub-carriers throughout a frequency band or the number of sub-carriers in an OFDM symbol. Those skilled in the art can perform the step S21 in any existing channel estimation method.

Next the flow goes to the step S22 where the user equipment 21 determines a channel correlation matrix with the base station 1 according to the result of estimating the channel, which can be represented particularly in the equation of:

$$R_{ij} = (1-\alpha)R_{i(j-1)} + \alpha \frac{1}{|S|} \sum_{l=1}^{|S|} H_{lj}^H H_{lj} \quad (1)$$

Where the subscript i represents a user equipment and the subscript j represents a frame, so $R_{ij}$ represents a channel covariance matrix of the $i^{th}$ user equipment in the $j^{th}$ frame, i.e., a channel correlation matrix, and $R_{i(j-1)}$ represents a spatial covariance matrix of the $i^{th}$ user equipment in the $(j-1)^{th}$ frame. $R_{ij}$ is derived via a receiver of the user equipment 21 estimating the channel matrix H and weighting the spatial covariance matrix $R_{i(j-1)}$ of the $(j-1)^{th}$ frame and a spatial covariance matrix average of the $j^{th}$ frame by an iteration factor, where the spatial covariance matrix average is an average over a space of $|S|$ samples.

$|S|$ represents the average number of sub-carriers when the spatial correlation matrix is determined, $H_{lj}$ represents a channel matrix between the user equipment and the base station 1 over the $l^{th}$ sub-carrier in the $j^{th}$ frame, and α represents an average factor in the time domain and $0<\alpha \leq 1$. If the channel matrix exhibits strong frequency selectivity, then a wideband average may lower a frequency selective scheduling gain and degrade the performance, while a narrowband feedback may be at the cost of an increased feedback overhead. In the equation (1), R represents a short-term value for $\alpha=1$, and the short-term value of R is accumulated over a longer period of time for $0<\alpha<1$ so that the long-term average of the spatial correlation matrix approximates to the statistical average thereof. The precision of a feedback can be improved by taking the average of R in the time domain when the user equipment moves at a low or middle speed.

According to an embodiment of the invention, the user equipment makes the foregoing feedback once per frame to the base station 1 by taking into account both the time variability of the channel and the signaling overhead. Of course, the occasion of a feedback can be selected otherwise in light of the prior art or future development in the art, and the invention will not be limited in this respect.

The same codebook is pre-stored in both the base station and the user equipments in the codebook-based solution, and this codebook is modified to continue its use in the invention, particularly as follow:

In the step S23, the user equipment 21 determines a plurality of new pre-coding vectors according to the pre-stored codebook in the equation of:

$$c' = \frac{R_{ij}c}{|R_{ij}c|} \quad (2)$$

Where c represents one pre-coding vector among a plurality of pre-coding vectors pre-stored in the codebook, and c' represents one new pre-coding vector determined from c.

Then sixteen new pre-coding vectors can be determined correspondingly if there are originally sixteen pre-coding vectors in the codebook. Since different user equipments derives different $R_{ij}$S, there is an intimate association or correspondence relationship between the derived new codebook including the sixteen new pre-coding vectors and the user equipment.

Also in the step S23, the user equipment 21 further selects at least one new pre-coding vector complying with a predetermined rule from the sixteen new pre-coding vectors. There are a variety of specific selection methods including those in the prior art, e.g., a maximum capacity criterion, a maximum mean-square error criterion, etc., and with use of these new pre-coding vectors one by one, the user equipment 21 can roughly estimate a specific pre-coding vector to be used for the base station 1 with a maximum capacity or a maximum mean-square error. Those skilled in the art can appreciate that the invention will not be limited to any number of determined new pre-coding vectors, and preferably when the performance of a new pre-coding vector is far above that of any other new pre-coding vector, then this new pre-coding vector can be determined for use; and when a plurality of new pre-coding vectors perform equivalently, one or more of them can be determined for use, and the flow goes to the next step.

After at least one new pre-coding vector is determined, the user equipment 21 determines at least one pre-stored pre-coding vector for generating the at least one new pre-coding vector in the equation (2), and then the step S23 ends.

Thereafter in the step S24, the user equipment 21 notifies the base station 1 about the previously determined spatial correlation matrix and the pre-coding vector. According to an embodiment of the invention, such information is transmitted after being quantified appropriately, and a quantifying process will be described below.

In the codebook of the prior art, each pre-coding vector is provided with an identifier on which the base station 1 and the respective user equipments have agreed, i.e., a PMI, and in an embodiment of the invention, the user equipment 21 can also identify one or more specific pre-stored pre-coding vectors it selects by transmitting the PMI(s) to the base station 1 as in the prior art.

Since bits in which $R_{ij}$ is transmitted are an additional signaling overhead relative to the LTE Rel-8, it is useful to address how to minimize the number of required bits according to the invention. For example, different error guards are allocated for transmission of the PMI and a feedback of $R_{ij}$ to thereby optimize a balance between the signaling overhead and the system performance. The parameters of R are fed back directly in a simulation. In order to maintain the signaling overhead at a low level, the determined $R_{ij}$ is fed back in 28 bits in a scenario with four antennas, where two bits are allocated for each diagonal element and four bits are allocated for each off-diagonal element.

The invention will not be limited to any specific method in which $R_{ij}$ is fed back. In an alternative quantifying method, the characteristic and application context of $R_{ij}$ will be taken into account for an as small number of bits as possible. $R_{ij}$ be normalized by the largest diagonal element, and $R_{ij}$ is constituted of three categories of independent random variables, i.e., a diagonal element, and a related coefficient amplitude $r_{ij}$ and a related coefficient phase $\theta_{ij}$ of an off-diagonal element. Particularly an off-diagonal element can be represented in the equation of:

$$R_{ij} = r_{ij}\sqrt{R_{ii}R_{jj}}e^{j\theta_{ij}} \quad (3) \quad 0 \le r_{ij} < 1, 0 \le \theta_{ij} < 1.$$

Particularly the same category of random variables are regarded as being independently identically distributed. Therefore, a codebook can be set for each of the three categories of random variables in view of their distributions in a correlated context so that the three codebooks are independent of each other. The number of bits occupied by a quantified spatial correlation matrix is the sum of the numbers of bits in the respective quantified random variables.

As an alternative, quantified dominant eigenvectors of $R_{ij}$ can constitute spatial correlation information to save an overhead of feedback signaling.

Upon reception of the feedbacks of the user equipments 21 to 23, the base station 1 determines channel conditions between the base station 1 and the user equipments 21 to 23 based the pre-coding vectors and the spatial correlation matrixes determined respectively by the user equipments 21 to 23 in the step S11.

Particularly the base station 1 determines the channel conditions with the respective user equipments based on the equation of:

$$h_i = \frac{R_i c_p}{|R_i c_p|} \quad (4)$$

Where $h_i$ represents the channel condition determined by the $i^{th}$ user equipment among the user equipments 21 to 23, $R_i$ represents the spatial correlation matrix determined by the $i^{th}$ user equipment, and $c_p$ represents the pre-coding vector determined by the $i^{th}$ equipment.

Thereafter the base station 1 processes downlink communication with the user equipments 21 to 23 according to the determined channel conditions with the user equipments 21 to 23. For example, the user equipments 21 and are put together for communication in multi-user MIMO, and communication in single-user MIMO is performed with the user equipment 23. For these subsequent operations, reference can be made to scheduling and control operations performed based upon the original codebook in the prior art, and a repeated description thereof will be omitted here.

Apparatuses according to the invention will be described below with reference to block diagrams of the apparatuses but briefly in view of a correspondence relationship between units and elements in these apparatuses and the foregoing features of steps.

Figure 3:
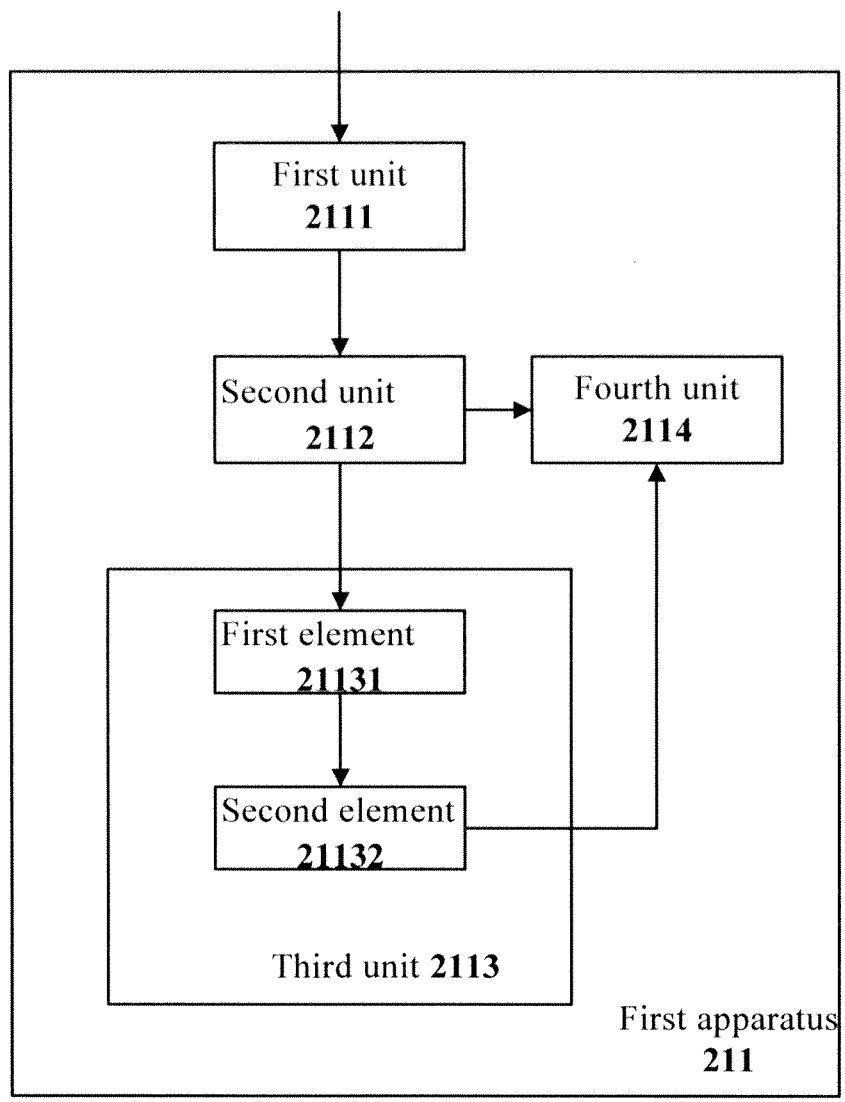
FIG. 3 illustrates a block diagram of a first apparatus for assisting a base station in processing downlink communication in a user equipment according to an embodiment of the invention.

FIG. 3 illustrates a block diagram of a first apparatus for assisting a base station in processing downlink communication in a user equipment according to an embodiment of the invention, where the first apparatus 211 is typically located in the user equipments 21 to 23 illustrated in FIG. 1 and particularly includes:

A first unit 2111 is for estimating a downlink channel between the base station 1 and the user equipment, in correspondence to the foregoing step S21;

A second unit 2112 is for determining a spatial correlation matrix between the base station 1 and the user equipment according to the result of estimating the downlink channel, in correspondence to the foregoing step S22;

A third unit 2113 is for determining at least one pre-coding vector among a plurality of pre-stored pre-coding vectors based upon the spatial correlation matrix, in correspondence to the foregoing step S23; and A fourth unit 2114 is for notifying the base station about the determined at least one pre-coding vector and spatial correlation matrix, in correspondence to the foregoing step S24.

Furthermore the third unit 2113 includes the following elements to particularly perform its functions:

A first element 21131 is for generating a plurality of new pre-coding vectors according to the spatial correlation matrix and the plurality of pre-stored pre-coding vectors; and A second element 21132 is for selecting at least one new pre-coding vector among the plurality of new codewords according to a predetermined rule and determining at least one pre-stored pre-coding vector for generating the at least one new pre-coding vector.

Particularly the first element 21131 generates the plurality of new pre-coding vectors according to the equation of:

$$c' = \frac{R_{ij}c}{|R_{ij}c|}$$

Where c represents one pre-coding vector among the plurality of pre-stored pre-coding vectors, and c' represents one new pre-coding vector determined from c.

Figure 4:
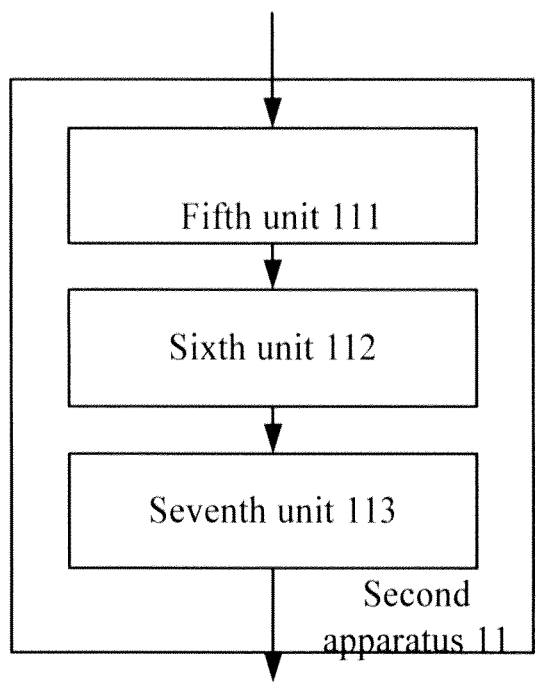
FIG. 4 illustrates a block diagram of a second apparatus for processing downlink communication in a base station with the assistance of a user equipment according to an embodiment of the invention.

FIG. 4 illustrates a block diagram of a second apparatus for processing downlink communication in a base station with the assistance of a user equipment according to an embodiment of the invention, and the second apparatus 11 is typically located in the base station 1 illustrated in FIG. 1 and includes:

A fifth unit 111 is for acquiring pre-coding vectors and spatial correlation matrixes determined respectively by the user equipments 21 to 23, in correspondence to the foregoing step S24;

A sixth unit 112 is for determining channel conditions between the base station 1 and the user equipments 21 to 23 based the pre-coding vectors and the spatial correlation matrixes determined respectively by these user equipments, in correspondence to the foregoing step S11; and A seventh unit 113 is for processing downlink communication between the base station 1 and the user equipments 21 to 23 according to the determined channel conditions between the base station 1 and the user equipments 21 to 23, in correspondence to the foregoing step S12.

Particularly the sixth unit 112 determines the channel conditions between the base station 1 and the user equipments 21 to 23 according to the equation of:

$$h_i = \frac{R_i c_p}{|R_i c_p|},$$

Where $h_i$ represents the channel condition determined by the $i^{th}$ user equipment among the user equipments 21 to 23, $R_i$ represents the spatial correlation matrix determined by the $i^{th}$ user equipment, and $c_p$ represents the pre-coding vector determined by the $i^{th}$ user equipment.

In order to better illustrate the technical advantages of the invention, the following simulation result will be reviewed, where the simulation was performed in a cellular context of 19 base stations/57 pentagons, and specific parameters and hypothetic models are as depicted below:

TABLE 1

Simulation parameters and hypothetic models

| Parameter | Value |
| --- | --- |
| Channel model | ITU Urban Micro and Urban Macro |
| Antenna configuration | Base station (eNB) with four transmission antennas: ULA, 0.5 wavelength (Configuration C) User equipment with two reception antennas: ULA, 0.5 wavelength |
| Duplex mode | Frequency Division Duplex (FDD) |
| Scheduling | Probability fair and frequency selective scheduling Scheduling granularity of one sub-frame |
| Link adaptation | Non-ideal Channel Quality Indicator (CQI) |
| Channel estimation | Ideal channel estimation |
| Feedback parameter | CQI/PMI reporting periodicity: 5 ms Spatial correlation matrix reporting periodicity: 5/20/100 ms CQI/PMI feedback: sub-band (five resource blocks) Spatial correlation matrix feedback: Wideband Delay: 6 ms |
| Downlink precoding scheme | Zero-forcing |
| Downlink HARQ | Synchronous HARQ, CC, the largest number of transmissions: four times |
| Control channel and reference signal overhead | 0.3026 |
| Codebook | 4-bit codebook for four transmission antennas in the LTE Rel-8 |

TABLE 2

Performance of spatial correlation matrix-aided PMI-based feedback mechanism in zero-forcing pre-coding scheme

| Codebook | Channel model | Spatial correlation matrix reporting periodicity | Cell average spectrum efficiency (bit/second/Hz) | Cell edge spectrum efficiency (bit/second/Hz) |
| --- | --- | --- | --- | --- |
| LTE Rel-8 codebook without the aid of a spatial correlation matrix | Umi | n/a | 2.60 | 0.068 |
| LTE Rel-8 codebook with the aid of a spatial correlation matrix | Umi | 5 ms | 3.13 | 0.070 |
| LTE Rel-8 codebook with the aid of a spatial correlation matrix | Umi | 20 ms | 3.11 | 0.070 |
| LTE Rel-8 codebook with the aid of a spatial correlation matrix | Umi | 100 ms | 3.08 | 0.069 |
| LTE Rel-8 codebook without the aid of a spatial correlation matrix | Uma | n/a | 2.28 | 0.060 |
| LTE Rel-8 codebook with the aid of a spatial correlation matrix | Uma | 20 ms | 2.53 | 0.058 |

As can be apparent from the simulation, the fed-back spatial correlation matrix brought a performance gain of 20% in the Umi channel model and 11% in the Uma channel model. Also the cell spectrum efficiency keeps substantially unchanged when the periodicity at which the spatial correlation matrix is reported is 5 ms, 2 Oms and 100 ms respectively. This shows that a longer periodicity at which the spatial correlation matrix is reported can be adopted in a practical system to lower a feedback overhead of the system. By way of an example, if the correlation matrix is fed back in 28 bits per 100 ms in this simulation, then an additional overhead of 28/(100/5)=1.4 bit is equivalently introduced per CQI&PMI feedback periodicity.

As can be apparent to those skilled in the art, the invention will not be limited to the details of the foregoing illustrative embodiments and can be embodied in other specific forms without departing from the spirit or essence of the invention. Therefore the embodiments shall be construed in any respect as being illustrative but not limiting, and the scope of the invention shall be defined in the appended claims instead of the foregoing description, so the invention is intended to encompass all the variations coming into the scope of the claims and their equivalents. Any reference numerals in the claims shall not be construed as limiting the claims where they appear. Furthermore apparently the term "comprising" will not preclude another element or step and a singular form will not preclude a plural form. A plurality of units or means recited in a system claim can alternatively be implemented as a single unit or means in software or hardware. The words "first", "second", etc., are intended to represent a name without suggesting any specific order.

The invention claimed is:

1. A method for assisting a base station in processing downlink communication in a user equipment, comprising:
   estimating a downlink channel between the base station and the user equipment;
   determining a spatial correlation matrix between the base station and the user equipment according to the result of estimating the downlink channel;
   determining at least one new pre-coding vector based on a plurality of pre-stored pre-coding vectors and the spatial correlation matrix; and
   notifying the base station about the determined at least one new pre-coding vector by identifying a corresponding at least one pre-stored pre-coding vector for generating the at least one new pre-coding vector and providing the spatial correlation matrix.

2. The method according to claim 1, wherein when the user equipment is the $i^{th}$ user equipment, its spatial correlation matrix in the $j^{th}$ frame is based at least in part on the equation:

$$R_{ij} = (1-\alpha)R_{i(j-1)} + \alpha \frac{1}{|S|} \sum_{l=1}^{|S|} H_{lj}^H H_{lj},$$

wherein |S| represents the average number of sub-carriers when the spatial correlation matrix is determined, $H_{lj}$ represents a channel matrix between the user equipment and the base station over the $l^{th}$ sub-carrier in the $j^{th}$ frame, and $\alpha$ represents an average factor in the time domain and $0<\alpha \leq 1$.

3. The method according to claim 1, wherein the determining of the at least one new pre-coding vector comprises:
   generating a plurality of new pre-coding vectors according to the spatial correlation matrix and the plurality of pre-stored pre-coding vectors;
   selecting the at least one new pre-coding vector among the plurality of new pre-coding vectors according to a pre-determined rule; and
   determining at least one pre-stored pre-coding vector for generating the at least one new pre-coding vector.

4. The method according to claim 3, wherein the plurality of new pre-coding vectors are based at least in part on the equation:

$$c' = \frac{R_{ij}c}{|R_{ij}c|},$$

wherein c represents a pre-coding vector among the plurality of pre-stored pre-coding vectors, and c' represents a corresponding new pre-coding vector determined from c.

5. A method for processing downlink communication in a base station with the assistance of a user equipment, comprising:
   acquiring pre-coding vectors and spatial correlation matrixes determined respectively by a plurality of user equipments;
   determining channel conditions between the base station and the plurality of user equipments based the pre-coding vectors and the spatial correlation matrixes determined respectively by the plurality of user equipments; and
   processing downlink communication between the base station and the plurality of user equipments according to the determined channel conditions between the base station and the plurality of user equipments;
   wherein the acquired pre-coding vectors and spatial correlation matrixes include at least one pre-coding vector and a corresponding spatial correlation matrix acquired from a particular user equipment that provides notice about at least one new pre-coding vector for downlink communications between the base station and the particular user equipment.

6. The method according to claim 5, wherein determining the channel conditions is based at least in part on the equation:

$$h_i = \frac{R_i c_p}{|R_i c_p|},$$

wherein $h_i$ represents the channel condition determined by the $i^{th}$ user equipment among the plurality of user equipments, $R_i$ represents the spatial correlation matrix determined by the $i^{th}$ user equipment, and $c_p$ represents the pre-coding vector determined by the $i^{th}$ user equipment.

7. A first apparatus for assisting a base station in processing downlink communication in a user equipment, comprising:
   a processor configured to estimate a downlink channel between the base station and the user equipment;
   wherein the processor is also configured to determine a spatial correlation matrix between the base station and the user equipment according to the result of estimating the downlink channel;
   wherein the processor is also configured to determine at least one new pre-coding vector based on a plurality of pre-stored pre-coding vectors and the spatial correlation matrix; and
   a communication unit configured to notify the base station about the determined at least one new pre-coding vector by identifying a corresponding at least one pre-stored pre-coding vector for generating the at least one new pre-coding vector and providing the spatial correlation matrix.

8. The first apparatus according to claim 7, wherein when the user equipment is the $i^{th}$ user equipment, its spatial correlation matrix in the $j^{th}$ frame is based at least in part on the equation:

$$R_{ij} = (1-\alpha)R_{i(j-1)} + \alpha \frac{1}{|S|} \sum_{l=1}^{|S|} H_{lj}^H H_{lj},$$

wherein |S| represents the average number of sub-carriers when the spatial correlation matrix is determined, $H_{lj}$ represents a channel matrix between the user equipment and the base station over the $l^{th}$ sub-carrier in the $j^{th}$ frame, and $\alpha$ represents an average factor in the time domain and $0<\alpha \leq 1$.

9. The first apparatus according to claim 7, wherein the processor comprises:
a generating element configured to generate a plurality of new pre-coding vectors according to the spatial correlation matrix and the plurality of pre-stored pre-coding vectors; and
a selecting element configured to select the at least one new pre-coding vector among the plurality of new pre-coding vectors according to a predetermined rule;
wherein the selecting element is also configured to determine at least one pre-stored pre-coding vector for generating the at least one new pre-coding vector.

10. The first apparatus according to claim 9, wherein the generating element is configured to generate the plurality of new pre-coding vectors based at least in part on the equation:

$$c' = \frac{R_{ij}c}{|R_{ij}c|},$$

wherein c represents a pre-coding vector among the plurality of pre-stored pre-coding vectors, and c' represents a corresponding new pre-coding vector determined from c.

11. A second apparatus for processing downlink communication in a base station with the assistance of a user equipment, comprising:
a communication unit configured to acquire pre-coding vectors and spatial correlation matrixes determined respectively by a plurality of user equipments; and
a processor configured to determine channel conditions between the base station and the plurality of user equipments based the pre-coding vectors and the spatial correlation matrixes determined respectively by the plurality of user equipments;
wherein the processor is also configured to process downlink communication between the base station and the plurality of user equipments according to the determined channel conditions between the base station and the plurality of user equipments;
wherein the pre-coding vectors and spatial correlation matrixes acquired by the communication unit include at least one pre-coding vector and a corresponding spatial correlation matrix acquired from a particular user equipment that provides notice about at least one new pre-coding vector for downlink communications between the base station and the particular user equipment.

12. The second apparatus according to claim 11, wherein the processor is configured to determine the channel conditions between the base station and the plurality of user equipments based at least in part on the equation:

$$h_i = \frac{R_i c_p}{|R_i c_p|},$$

wherein $h_i$ represents the channel condition determined by the $i^{th}$ user equipment among the plurality of user equipments, $R_i$ represents the spatial correlation matrix determined by the $i^{th}$ user equipment, and $c_p$ represents the pre-coding vector determined by the $i^{th}$ user equipment.

13. A user equipment, comprising the first apparatus according to claim 7.

14. A base station, comprising the second apparatus according to claim 11.

15. The method according to claim 1 wherein the plurality of pre-stored pre-coding vectors are stored in a codebook at the user equipment and at the base station.

16. The method according to claim 5 wherein the at least one new pre-coding vector is determined by the particular user equipment based on a plurality of pre-stored pre-coding vectors and the corresponding spatial correlation matrix.

17. The method according to claim 5 wherein the corresponding spatial correlation matrix is determined by the particular user equipment based on an estimate of a downlink channel between the base station and the particular user equipment.

18. The first apparatus according to claim 7 wherein the plurality of pre-stored pre-coding vectors are stored in a codebook at the user equipment and at the base station.

19. The second apparatus according to claim 11 wherein the at least one new pre-coding vector is determined by the particular user equipment based on a plurality of pre-stored pre-coding vectors and the corresponding spatial correlation matrix.

20. The second apparatus according to claim 11 wherein the corresponding spatial correlation matrix is determined by the particular user equipment based on an estimate of a downlink channel between the base station and the particular user equipment.

* * * * *